Sept. 1, 1942.   A. HENDERSON   2,294,556
FLOATING EXTERNAL WALLS FOR BUILDINGS
Filed April 4, 1941   6 Sheets-Sheet 1

INVENTOR
Albert Henderson
by his attys
Stebbins and Blenko Sept. 1, 1942. A. HENDERSON 2,294,556
FLOATING EXTERNAL WALLS FOR BUILDINGS
Filed April 4, 1941 6 Sheets-Sheet 5

INVENTOR
Albert Henderson
by his attys.
Stibbins and Banks

Patented Sept. 1, 1942

2,294,556

UNITED STATES PATENT OFFICE 2,294,556

FLOATING EXTERNAL WALL FOR BUILDINGS

Albert Henderson, Edgewood Borough, Pa., assignor to William P. Witherow, Pittsburgh, Pa.

Application April 4, 1941, Serial No. 386,931

9 Claims. (Cl. 72—16)

This invention relates generally to building construction and, in particular, to a wall construction particularly adapted for the construction of fireproof buildings.

Fireproof buildings as now constructed usually include a supporting frame of concrete or steel and external walls rigidly anchored thereto and composed of large numbers of small units which must be laid individually, resulting in an enormous over-all length of joints therebetween. Exterior building walls, being subjected to severe temperature changes, necessarily expand and contract to a certain extent. This causes the joints to open more or less, permitting leakage of rain and cold air into the interior of the wall. Conventional walls, furthermore, are quite costly because of the large amount of hand labor required in laying up small units and finishing the joints therebetween.

I have invented a novel form of building construction which overcomes the aforementioned objections to conventional constructions and is characterized by additional novel features and advantages. In a preferred embodiment of the invention, I provide an exterior wall for buildings (and by wall I mean a roof deck as well as a true, vertical wall) composed of a relatively small number of large units so mounted on the supporting frame, whether of steel or concrete, as to be movable in all directions in the plane of the wall, relative to the frame, without opening up the joints between members or subjecting the latter to excessive tension or compression stress. The invention makes possible the quick completion of a building once the frame is erected. The over-all length of joints between wall units is much less than that characteristic of conventional wall construction and there is no danger of leaks in the wall developing from expansion and contraction due to temperature changes. A further advantage of the invention is that the wall units may be salvaged to the extent of practically 100% if it is desired to dismantle the building. Another advantage is that the wall units have provision for resiliently mounting window sash therein without the necessity of special sills, lintels or mullions. The wall units may also be used for coping or parapets.

Further details of the construction of my invention as well as other novel features and advantages will be explained during the following complete description of a preferred embodiment and certain modifications thereof illustrated in the accompanying drawings. In the drawings.

Referring now in detail to the drawings and, for the present, to Figures 1 through 11, a building frame is composed of spaced columns 10 and connecting girders 11 and 12. Floors 13 and a roof deck 14 may conveniently be composed of long-spanned, channel-section, precast, concrete slabs laid side by side on the girders 12 and extending in single length therebetween. The exterior wall of the building is composed of precast slabs 15 adapted to serve as spandrel units extending between adjacent columns 10 and precast slabs 16 adapted to serve as mullion units extending vertically between the spandrel units of adjacent floors of the building. Steel sash 17 is installed in the areas betwen adjacent spandrel and mullion units. The topmost spandrel units constitute a coping or parapet 18 and are provided with a recess 19 in their rear face adapted to receive the edge of metal flashing 20 extending inwardly from the parapet over a portion of the roof deck 14.

Figure 1:
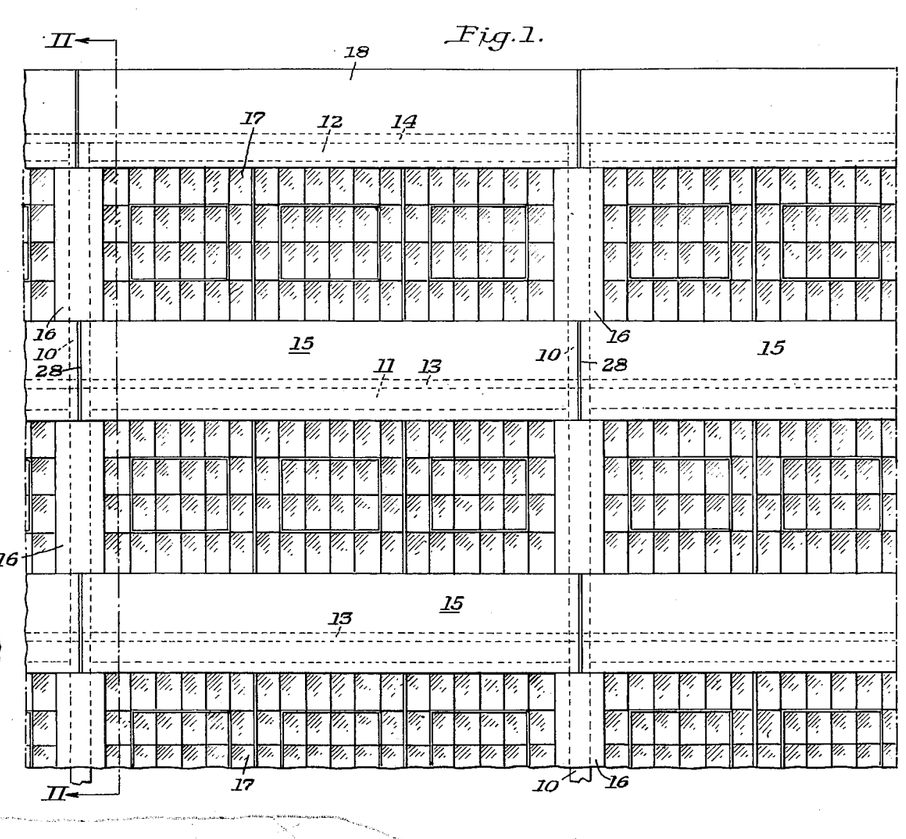
Figure 1 is a partial side elevation of a building embodying my invention.
Figure 2:
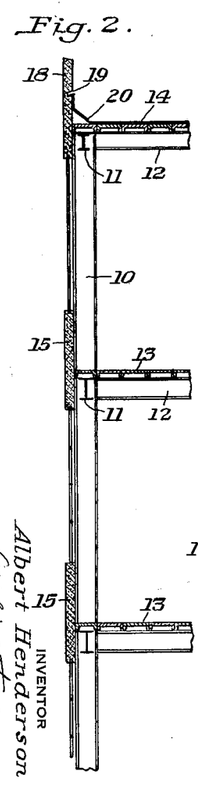
Figure 2 is a partial vertical section therethrough taken substantially along the plane of line II—II of Figure 1.
Figures 3, 4, 5, 6, 7, 8, 8A:
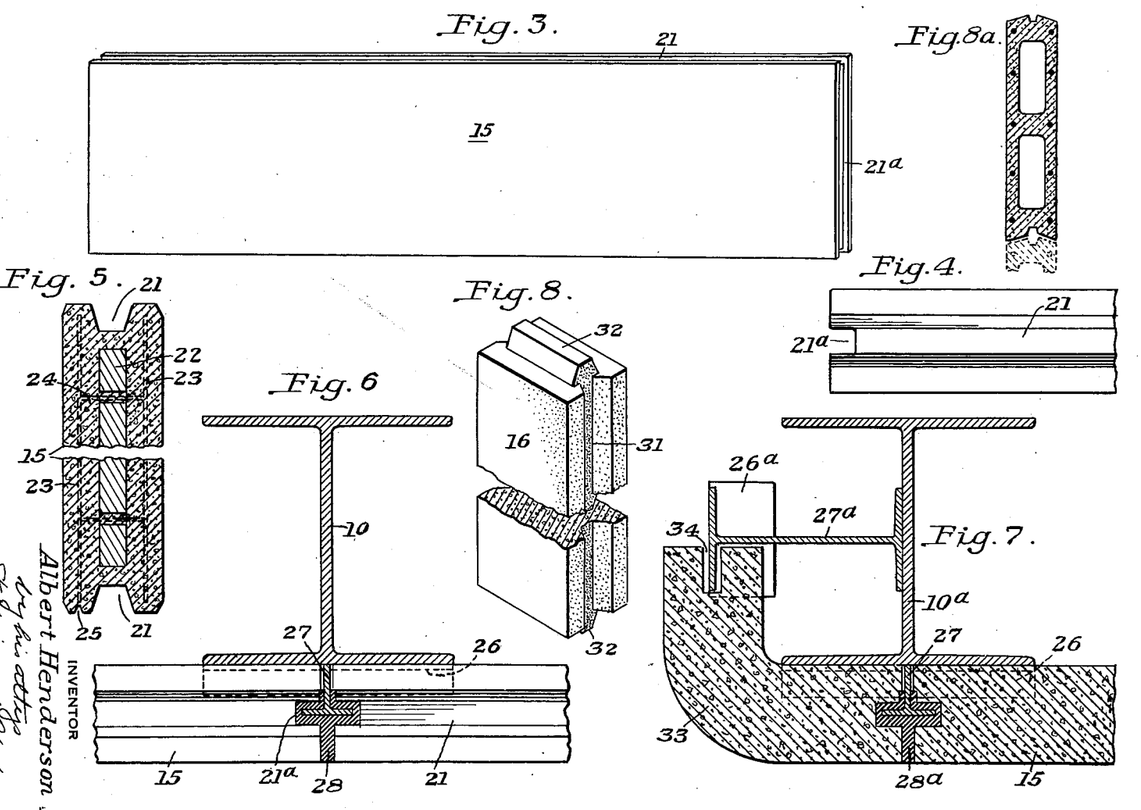
Figure 3 is a perspective view of a preferred form of wall unit or slab adapted to serve as a spandrel.
Figure 4 is a partial edge view of the spandrel slab.
Figure 5 is a transverse section therethrough.
Figure 6 is a horizontal section through a column forming part of the building frame, showing vertically disposed wall slabs in plan.
Figure 7 is a view similar to Figure 6 showing a section through the wall at a corner of the building and a special wall unit for installation thereat.
Figure 8 is a perspective view of a wall unit or slab adapted to serve as a mullion extending between adjacent spandrel slabs.
Figure 8a is a section showing a modified form of a spandrel panel.

The details of the spandrel unit 15 are shown in Figures 3 through 5. As there illustrated, the unit comprises a slab having grooves 21 extending along the side edges thereof and grooves 21a extending along its end edges. A panel of thermal insulating material 22 such as Celotex is embedded in the slab. Reinforcing mesh 23 is also embedded in the slab on opposite sides of the panel 22. The panel has holes therein through which reinforcing rods 24 extend connecting the two layers of mesh 23. The side edge of the slab which is exposed to the weather when it is installed is provided with a drip groove 25 which causes rain to drip off the exposed edge of the slab instead of traveling inwardly therealong.

Figure 8a shows a modified form of a spandrel panel which will permit rain to drip. When the spandrel panels are used to make up a solid floating wall, the type of joint formed between them will prevent passage of water. The mullion unit will have the same type of joint at its top and bottom ends.

The spandrel units 15 are supported on the columns 10 by short lengths of angles 26 welded to the columns to form horizontal shelves or seats. The spandrel units, furthermore, are keyed to the columns by T-bars or I-beams 27 welded vertically to the outer flanges of the columns. The mounting of the seating angles 26 and keying I-beams 27 is clearly shown in Figures 9 and 10, the wall units themselves being omitted in these figures.

The spandrel units 15 are installed by raising them above the upper ends of the keying I-beams 27, and when the end grooves 21a of the spandrel units are alined with the flanges of the I-beams 27, the units are lowered onto the horizontal seats provided by the angles 26. Before placing the spandrel units, angles 26 are covered with a layer of rubber putty such as Plastikon to provide a resilient setting therefor. After the spandrel units have been placed, the spaces between the ends of adjacent units are filled with Plastikon as shown at 28 by means of a gun or others suitable means. As a result, each spandrel unit is free to move longitudinally or sidewise in its vertical plane, being resiliently or floatingly anchored to the columns and not rigidly bound thereto.

Figures 9, 10, 11, 12, 13, 14:
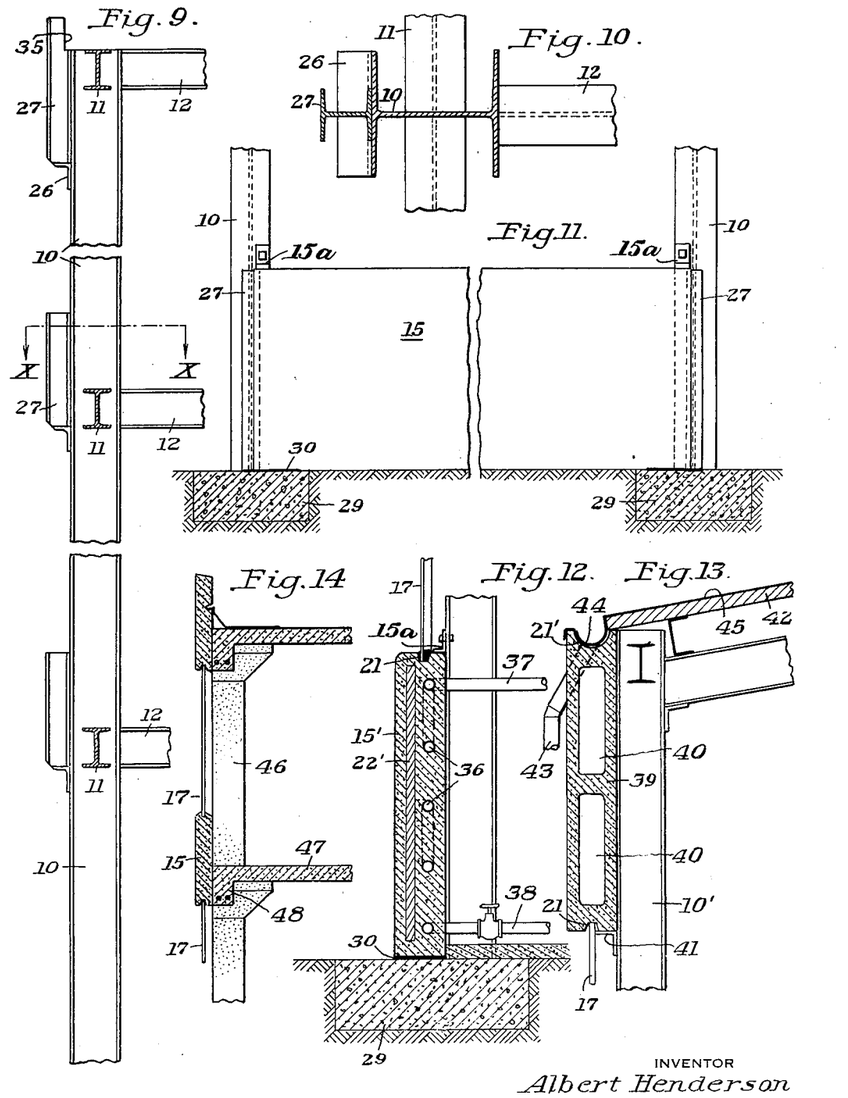
Figure 9 is a partial section through the building frame only, taken substantially along the plane of line II—II of Figure 1, showing the provision for securing the wall slabs to the frame.
Figure 10 is a partial horizontal section taken substantially along the plane of line X—X of Figure 9.
Figure 11 is a partial side elevation of a wall embodying the invention showing one of a bottom course of wall units extending between spaced column footings.
Figure 12 is a partial transverse section through a wall unit of the bottom course showing a special form of slab having heating means incorporated therein.
Figure 13 is a transverse section through a modified form of wall including a spandrel slab having a drain gutter formed in its upper edge.
Figure 14 is a view similar to Figure 2 showing the application of the invention to a building having a concrete frame.

The spandrel units 15 of the first or bottom course are supported on spaced column footings 29 with a layer of Plastikon 30 therebetween. Since the wall units 15 constitute beams of high strength when installed, it is unnecessary to place a continuous footing course below the wall as is required in conventional construction. The spaced column footings 29 are all that is required to carry the wall. If desired, a shallow cinder filling may be laid under the spandrel units of the bottom course between the footings 29 to prevent the units from being heaved up on freezing of the ground therebelow.

The mullion units 16 as shown in Figure 8 have grooves 31 along their side edges and tongues 32 along their ends. These units are placed after the setting of each succeeding course of spandrel units. The tongues 32 on the bottom ends of the mullion units extend into the grooves 21 along the upper edges of the previously installed course of spandrel units, with a layer of Plastikon therebetween. The tongues 32 on the upper ends of the mullion units fit into the grooves 21 along the bottom edges of the next succeeding course of spandrel units 15. The tongues 32 thus effectively key the mullion units to the spandrel units. The grooves 31 in the mullion units and the grooves 21 in the spandrel units receive the edges of the steel sash 17 which are also installed as the wall goes up, the sash being lowered between adjacent mullion units before the placing of the spandrel units of the next course. The grooves 21 and 31 are lined with Plastikon whereby the sash are resiliently or floatingly supported relative to the spandrel and mullion units and are free to move slightly in the same manner as the latter, on expansion or contraction, without opening up joints.

Figure 7 illustrates a corner construction utilizing a special corner unit 33 which is simply a curved slab having slots 34 in its ends adapted to receive the flanges of a T-bar 27 and an auxiliary I-beam 27a secured to the corner column 10a. The I-beam 27a has angle brackets 26a welded thereto to support the curved wall unit 33. The angle brackets 26a, like the angle seats 26, are provided with a layer of Plastikon before the wall units 33 are placed, and the joints between the units 33 and the spandrel units 13 are filled with Plastikon as at 28a in the manner already described.

The spandrel units which form the coping or parapet 18 differ but slightly from the remaining spandrel units. In addition to the flash slot 19 along the rear face thereof, their upper edges are plane and have a slight inward slope. The I-beams 27 at the upper ends of the columns are notched as at 35 to avoid interference with the flashing 20 at the joints between adjacent spandrel units.

Figure 12 illustrates a slight modification and may be considered a transverse section through the spandrel units shown in Figure 11. The spandrel unit 15' in Figure 12 has its thermal insulating panel at 22' adjacent the exposed face of the unit and has piping 36 embedded therein through which a heating medium may be circulated by means of connections 37 and 38, providing an effective space heater. Figure 12 also shows how the edges of the sash 17 are bedded in Plastikon applied in the grooves 21 in the spandrel slabs. Short lengths of angle bar 15a secured to the columns prevent the unit 15' from being heaved up by frost.

Figure 13 shows a further modified form of spandrel slab 39. This slab has voids 40 therethrough and is supported on angle brackets 41 secured to the columns 10'. The upper edge of the spandrel unit 39, instead of having a groove 21 has a trough 21' adapted to conduct drainage from the roof deck 42 to a down-spout 43, the upper end of which communicates with a connection embedded in the unit 39. The trough 21' is lined with weather-resistant sheet-metal 44, such as copper, the inner edge of which extends under the water-proofing 45 laid over the roof deck 42. The outer edge of the sheet-metal lining for the trough 21' is bent down over the outer, upper edge of the spandrel unit 39.

Figure 14 illustrates the application of the invention to a building having a concrete frame including columns 46 and floor slabs 47 integral with girders 48. Spandrel units 15 are floatingly secured to the building frame in about the same manner as already indicated. Vertical support for these units is provided by shelves formed integral with the columns 46, a Plastikon layer being spread on the shelves before the spandrel units are placed. The units are resiliently anchored to the frame as before by vertical lengths of T-bar or I-beam. In the case of the concrete-frame building, these members are secured to the building frame by studs embedded in the latter.

Figure 15:
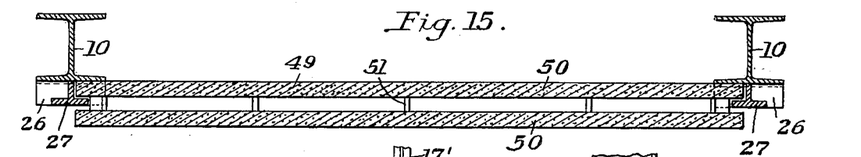
Figure 15 is a partial horizontal section through a spandrel slab of slightly different construction.
Figure 16:
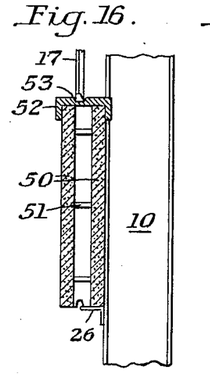
Figure 16 is a vertical section therethrough.

Figures 15 and 16 illustrate a modified form of spandrel unit 49. This unit is composed of spaced slabs 50 secured together by metal ties 51 embedded therein. The space between the slabs 50 receives the flanges of T-bars 27 welded to the columns 10 and the joints between the ends of adjacent units are filled with Plastikon in the manner already indicated. The unit 49 is provided with a metal channel 52 along its upper edge providing a sill and having a groove 53 for the sash 17.

Figures 17, 18:
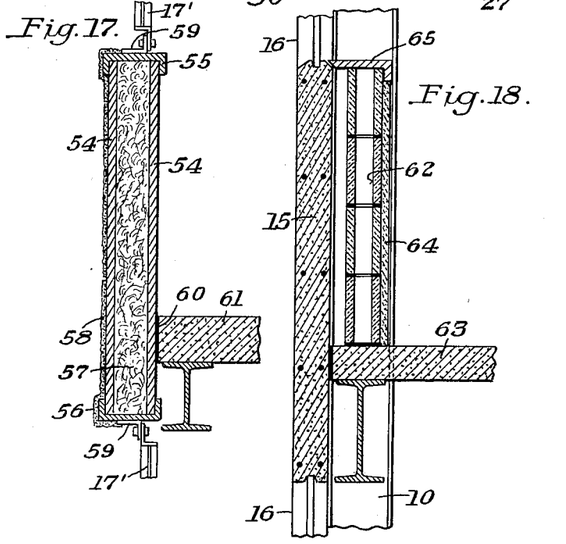
Figure 17 is a partial vertical section through a wall including a spandrel slab of further modified construction.
Figure 18 is a partial section through a wall according to my invention embodying a back-up layer rigidly supported on the building frame.

Figure 17 illustrates a further form of spandrel unit composed of spaced metal plates 54, a metal channel 55 serving as a sill and a similar channel 56 serving as a lintel. The interior of the unit is filled with rock wool indicated at 57 and the exposed surface of the slab is provided with a coating of weather resisting plastic material such as Insul-Mastic 58. Angles 59 are secured to the sill and lintel channels 55 and 56 for the attachment of sash 17'. A Plastikon layer 60 is disposed between spandrel units and the floor indicated at 61.

Figure 18 shows the construction illustrated in Figures 1 through 11 with the addition of a back-up wall which does not float but is rigidly supported on the building frame. The back-up wall is composed of hollow tile 62 laid up on the floor shown at 63 and covered with a plaster coat 64. A metal angle 65 provides an interior sill. With this construction, the exterior wall composed of spandrel units 15 and mullion units 16 is floatingly carried on the building frame while the interior surface of the outside walls of the building are firmly fixed to the frame.

Figures 19, 19A, 20, 21:
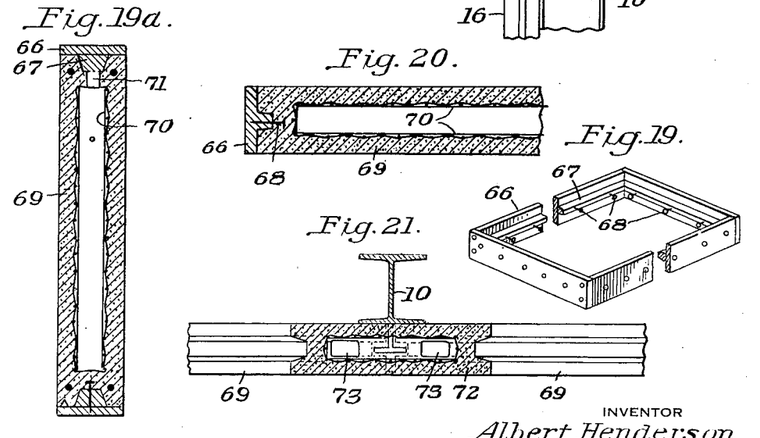
Figure 19 illustrates a novel form construction particularly suited for the manufacture of wall units such as illustrated in Figure 3.
Figure 19a is a transverse section through a wall unit having form side walls associated therewith adapted to serve as a shipping container.
Figure 20 is a partial horizontal section through the unit shown in Figure 19.
Figure 21 is a partial horizontal section through a mullion slab illustrating provision for circulating warm air through the wall unit.

Figure 19 illustrates a form suited for the manufacture of the spandrel units 15. It comprises four side walls 66 of wood, with groove-forming ribs 67 secured thereto. Nails 68 are driven part way into the ribs 67 and serve to anchor the form boards 66 to the spandrel slab cast therein. The form boards constitute a shipping container for the finished slab which serves to protect the edges thereof from breakage. The slabs are made by placing the assembled form boards on a table or other suitable support and pouring concrete therein. The heads of the nails 68 thus become embedded in the concrete and hold the form boards to the slab until they are forcibly detached therefrom on the job. This leaves the points of the nails sticking out from the bottom of the grooves 21 and 21a, but they may easily be bent down out of the way.

Hollow spandrel slabs 69 shown in Figures 19a and 20 may conveniently be moulded in a form such as that shown in Figure 19. One side of the slab is formed by pouring concrete in the form after placing reinforcing steel. A paper back mesh core 70 is then placed on the previously poured layer and the form filled with concrete to complete the slab. The rib 67, on the form board along one side of the slab may have an extension 71 adapted to provide a slot affording communication with the void in the interior of the slab.

In forming slabs by this method, I prefer to inject steam for curing purposes into the voids and fill the voids in the slabs with water after they have been partly cured. Thereafter, the water is dumped out and the slabs are baked to dryness to prevent further shrinkage in the field. They may then be sprayed with a colored liquid resin for the purpose of water-proofing and ornamentation. Instead of spraying a liquid resin, I may apply preformed sheets of resin by a suitable adhesive. The slot formed by the extension 71 of the rib 67 also facilitates picking up the slabs by suitable grab hooks.

The mullion units 16 as well as the spandrel units 15 may be made in the form illustrated in Figures 19a and 20. Figure 21 illustrates such a mullion unit 72. When such mullion units are employed, the spandrel units 69 have holes 73 formed in their edges near the ends thereof. As shown in Figure 21, these holes communicate with the interior of the mullion slabs 72 whereby conduits may be extended through the spandrel and mullion units or heating or cooling air delivered therethrough.

Figures 22, 23, 24:
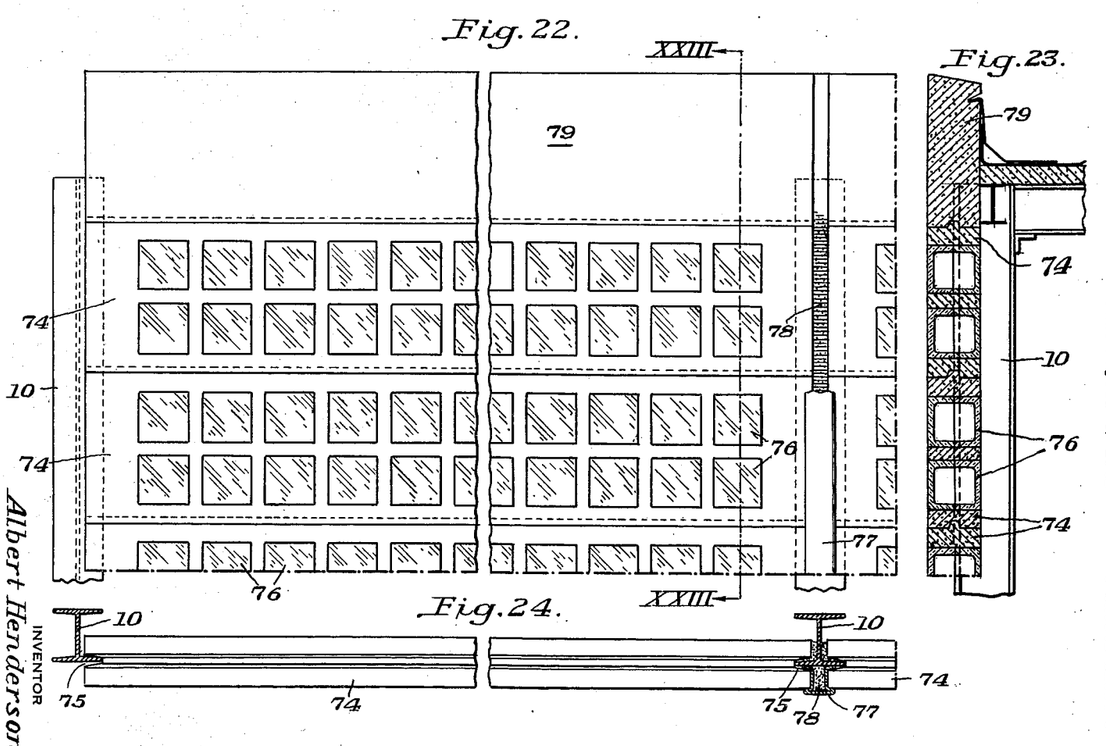
Figure 22 is a partial side elevation of a wall composed of units having glass blocks resiliently mounted therein.
Figure 23 is a partial vertical section taken substantially along the plane of line XXIII—XXIII of Figure 22.
Figure 24 is a partial section through adjacent columns of a building frame showing wall units in plan and a closure strip for the joint between the ends of the wall units.

Figures 22 through 24 illustrate a further modified form of wall composed of spandrel units 74. These units have their side edges provided with tongues and grooves and their end edges with grooves 75 adapted to receive the flanges of the columns 10. Glass blocks 76 are set in suitably dimensioned openings formed in the units 74 with a layer of Plastikon between the blocks and the surrounding slabs. The joints between the ends of adjacent slabs are filled by a spring closure strip 77 of stainless steel and a filling of Plastikon 78. A coping or parapet 79 is formed by a special spandrel unit or slab having a flashing slot similar to that shown at 19 in Figure 2. The horizontal joints between the units 74 are sealed with Plastikon applied therebetween as the units are installed.

Figures 25 through 28 illustrate a form of construction utilizing precast slabs which is particularly suitable for forming a roof deck but may also serve as a side wall. In the construction there shown, precast slabs 80 extend between adjacent supporting members 81, i. e. beams or columns. The slabs have studs 82 embedded therein which extend through slots 83 in the supporting members 81. This permits expansion or contraction of the slabs with changes in temperature. The supporting members 80 are provided with angle brackets 84 which carry the weight of the slabs if the members are vertical or the vertical component thereof if the members are sloping.

Figures 25, 26:
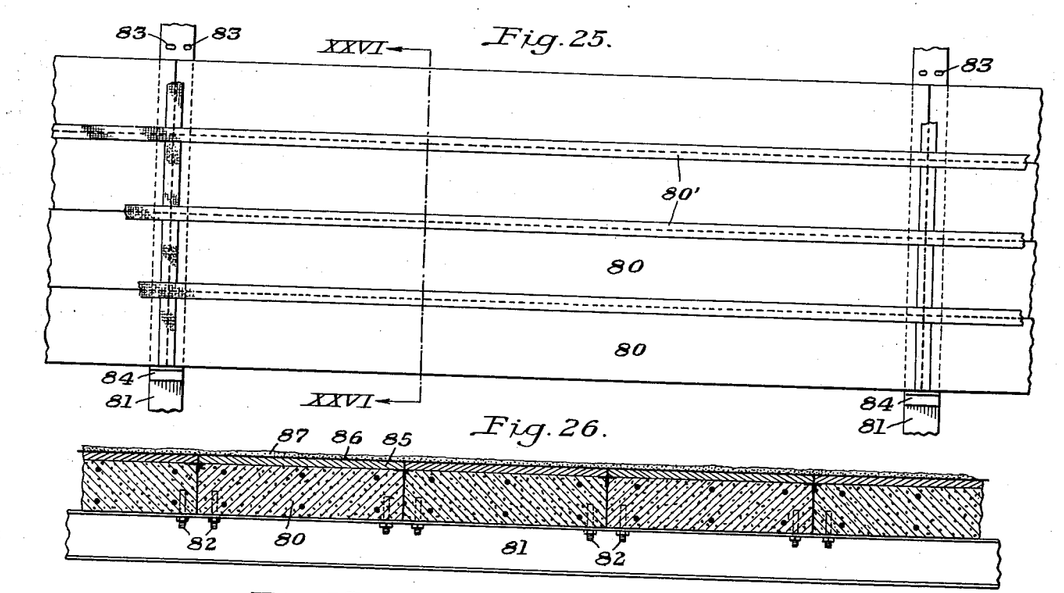
Figure 25 is a partial plan view of a form of construction particularly adapted to provide a roof deck, although it may also be used as a side wall.
Figure 26 is a transverse section therethrough taken substantially along the plane of line XXVI—XXVI of Figure 25.
Figure 27:
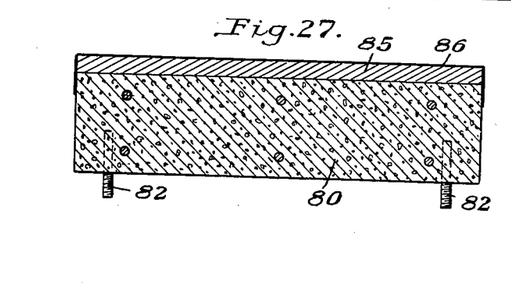
Figure 27 is a transverse section through one of the slabs of which the construction illustrated in Figures 25 and 26 is composed.

Each slab 80 is composed of reinforced concrete and has a panel of thermal insulation 85 bonded to the outer surface thereof. A layer of asphalt 86 is applied over the insulation panel and part way downwardly along the side edges of the slab. A sheet of muslin is pressed into the asphalt.

Figure 28:
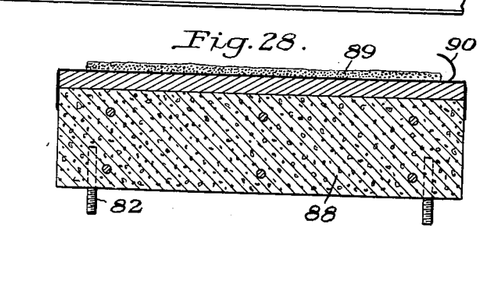
Figure 28 is a similar view showing a modification.

If the slabs 80 are used as a roof deck they are covered when laid, after the application of sealing strips 80' over the joints, with a layer of grits 87 which become bonded to the asphalt layer 86. In a modified form of slab 88 a layer of grits 89 is applied to the greater portion of the exposed surface of the slab before shipment to the job. As shown in Figure 28, the layer of grits 89 covers the slab except for the longitudinal margins thereof. Thus, when a roof is to be constructed of the slabs 88, the only field operation necessary in addition to the placing of the slabs is to apply sealing strips over the joints between slabs and cover them with grits. Instead of applying separate sealing strips of weather resisting metal such as copper, the edges of the asphalt and muslin of adjacent slabs may be turned back as illustrated at 90 and lapped to form a tight joint, after which additional grits may be placed thereover.

It will be apparent from the foregoing description and explanation that the invention provides a building construction having numerous advantages over previous practice. Some of these advantages have already been mentioned, such as the reduction in the time and cost of erecting building walls, the reduction in the over-all length of joints between wall units and the elimination of wall cracks and resulting leakage, by floatingly supporting the wall units for limited movement on expansion and contraction without opening up joints. A further advantage is that the invention provides a building construction which is completely enclosed by the installation of sash as the wall is built up, leaving practically no finishing operations to be completed later. The same applies to the roof which is practically weather-proof when the slabs are laid, except at the joints which can quickly be closed, thereby enabling work to proceed inside the building despite inclement weather.

Since the wall units provide integral sills and lintels and may also be used for coping and parapet walls, no special units are required for these parts of the building. The joints between the wall units are made weather-tight by a rubber putty sealing material. The latter may be obtained in colors and thus provide further ornamentation.

Although I have illustrated and described but a preferred embodiment and practice of the invention with certain modifications, it will be recognized that numerous changes in design and procedure may be made without departing from the spirit of the invention or the scope of the appended claims.

I claim:

1. In a building construction, a frame including spaced primary columns, a shelf extending outwardly from each column near the top thereof, a monolithic coping-wall panel bridging each pair of adjacent columns and resting on the shelves thereof, means securing said panels to said columns but leaving them free to expand and contract, the lower edge of the panel having a sash-receiving means thereby affording an integral lintel and the inner face of the panel having a slot therealong adapted to receive flashing.

2. In a building construction, a frame including spaced primary columns, a shelf extending outwardly from each column, a monolithic wall panel bridging each pair of adjacent columns and resting on the shelves thereof, and means securing said panels to said columns but leaving them free to expand and contract, at least one longitudinal edge of said panels having a sash-receiving groove whereby the panel affords an integral sill or lintel.

3. In a building construction, a frame including columns resting on spaced footings, a precast external wall panel extending between adjacent columns, resting on said footings, having substantial contact with the ground between said footings and subject to the heaving of the ground under the action of frost, means securing said panel to said columns but leaving them free to contract and expand and means on said columns engaging said wall panel in a manner such as to prevent it from being raised by heaving of the ground without interfering with longitudinal expansion and contraction of the panel.

4. A building construction as defined by claim 3 characterized by said columns having flanged members secured thereto which enter recesses at the ends of the panel, thereby preventing movement of the panel away from the columns yet leaving it free to expand and contract longitudinally.

5. In a building construction, a frame including primary columns resting on spaced footings, a monolithic wall panel bridging each pair of adjacent columns, said panels resting on said footings, having substantial contact with the ground between footings and subject to the heaving of the ground under the action of frost, keying members secured to said columns and having flanges which enter recesses in the ends of the panels to secure them against movement away from the columns but leave them free to expand and contract, and hold-down brackets secured to said columns engaging the upper edge of said panels to secure them against the upheaving of the ground while permitting longitudinal expansion and contraction of the panel.

6. In a building construction, a frame including spaced primary columns, a monolithic wall panel bridging each pair of adjacent columns, said panels having a sash-engaging means on their upper edge thereby affording an integral sill, shelves secured to said columns and extending outwardly thereof to support the panels, and keying members secured to the columns having flanges which enter recesses in the ends of the panels preventing movement thereof away from the columns but leaving them free to expand and contract.

7. In a building construction, a frame including spaced primary columns, continuous horizontal walls carried on said columns in vertically spaced relation leaving a window opening between the walls, said walls being composed of monolithic panels the width of which is the full height of the walls and the length of which is substantially the center-to-center spacing between adjacent columns, means securing said panels at their ends to said columns with freedom to expand and contract, and sash-engaging means on at least one edge of said panels, said panel-securing means including shelves extending outwardly from said columns below said panels.

8. In a building construction, a frame including spaced primary columns, continuous horizontal walls carried on said columns in vertically spaced relation leaving a window opening between the walls, said walls being composed of monolithic panels the width of which is the full height of the walls and the length of which is substantially the center-to-center spacing between adjacent columns, means securing said panels at their ends to said columns with freedom to expand and contract, and sash-engaging means on at least one edge of said panels, said panel-securing means including shelves extending outwardly from said columns below said panels and members extending along said columns and having flanges spaced laterally therefrom and engaging recesses in the respective ends of said panels.

9. In a building construction, a frame including spaced primary columns, continuous horizontal walls carried on said columns in vertically spaced relation leaving a window opening between the walls, said walls being composed of monolithic panels the width of which is the full height of the walls and the length of which is substantially the center-to-center spacing between adjacent columns, means securing said panels at their ends to the columns with freedom to expand and contract, said panel-securing means including shelves extending outwardly from the columns below the panels, and sash-engaging means on the edges of said panels, the sash-engaging means on said panels being oppositely disposed and adapted to engage and support a continuous sash positioned in said opening with freedom to expand and contract relative to the panels.

ALBERT HENDERSON.